(12) United States Patent
Soga

(10) Patent No.: US 8,913,277 B2
(45) Date of Patent: Dec. 16, 2014

(54) DOCUMENT DATA MANAGEMENT SYSTEM, MANAGEMENT METHOD AND PROGRAM

(75) Inventor: Masaya Soga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 13/593,039

(22) Filed: Aug. 23, 2012

(65) Prior Publication Data

US 2013/0050730 A1 Feb. 28, 2013

(30) Foreign Application Priority Data

Aug. 30, 2011 (JP) ................. 2011-187312

(51) Int. Cl.
*G06F 3/12* (2006.01)
*H04N 1/21* (2006.01)
*G06Q 10/10* (2012.01)
*H04N 1/00* (2006.01)
*H04N 1/32* (2006.01)

(52) U.S. Cl.
CPC ...... *H04N 1/2166* (2013.01); *H04N 2201/0094* (2013.01); *G06Q 10/10* (2013.01); *H04N 2201/3205* (2013.01); *H04N 1/00244* (2013.01); *H04N 1/32106* (2013.01); *H04N 2201/3209* (2013.01); *H04N 2201/3276* (2013.01)

USPC .......... 358/1.15; 358/1.13; 358/1.1; 715/206; 715/200; 709/225; 707/E17.095

(58) Field of Classification Search
None
See application file for complete search history.

(56) References Cited

U.S. PATENT DOCUMENTS

| 8,171,012 | B2 | 5/2012 | Soga | |
|---|---|---|---|---|
| 2003/0144961 | A1* | 7/2003 | Tharaken et al. | 705/57 |
| 2009/0116052 | A1* | 5/2009 | Matsuzawa | 358/1.14 |
| 2010/0262652 | A1* | 10/2010 | Soga | 709/203 |

FOREIGN PATENT DOCUMENTS

JP 2009-230221 A 10/2009

* cited by examiner

*Primary Examiner* — Paul F Payer
(74) *Attorney, Agent, or Firm* — Fitzpatrick, Cella, Harper & Scinto

(57) ABSTRACT

In a case in which a document stored based on a sort setting from a multifunction peripheral is operated at a temporary work area, a piece of information thereof is stored as temporary work area setting. A piece of operation information at a preceding time is set as an index in the temporary work area by copying the document to the temporary work area based on the sort setting when the document is stored from the multifunction peripheral at a next time by being reflected also to the sort setting.

5 Claims, 15 Drawing Sheets

| ADDRESS | SORT CONDITION | | STORAGE DESTINATION FOLDER | TEMPORARY WORK AREA COPY SETTING |
|---|---|---|---|---|
| 1 | TRANSMISSION SOURCE INFORMATION | 03-○○○○-xxxx (FACSIMILE NUMBER OF A CORPORATION [1]) | A CORPORATION | OFF |
| 2 | TRANSMISSION SOURCE INFORMATION | 044-△△△-xxxx (FACSIMILE NUMBER OF B CORPORATION) | B CORPORATION | OFF |
| 3 | TRANSMISSION SOURCE INFORMATION | 03-□□□□-xxxx (FACSIMILE NUMBER OF A CORPORATION [2]) | A CORPORATION | OFF |

FIG.6A

| ADDRESS | SORT CONDITION | | STORAGE DESTINATION FOLDER | TEMPORARY WORK AREA COPY SETTING |
|---|---|---|---|---|
| 1 | TRANSMISSION SOURCE INFORMATION | 03-○○○○-xxxx (FACSIMILE NUMBER OF A CORPORATION [1]) | A CORPORATION | OFF |
| 2 | TRANSMISSION SOURCE INFORMATION | 044-△△△-xxxx (FACSIMILE NUMBER OF B CORPORATION) | B CORPORATION | OFF |
| 3 | TRANSMISSION SOURCE INFORMATION | 03-□□□□-xxxx (FACSIMILE NUMBER OF A CORPORATION [2]) | A CORPORATION | OFF |

FIG.6B

| ADDRESS | SORT CONDITION | | STORAGE DESTINATION FOLDER | TEMPORARY WORK AREA COPY SETTING |
|---|---|---|---|---|
| 1 | TRANSMISSION SOURCE INFORMATION | 03-○○○○-xxxx (FACSIMILE NUMBER OF A CORPORATION [1]) | A CORPORATION | ON |
| 2 | TRANSMISSION SOURCE INFORMATION | 044-△△△-xxxx (FACSIMILE NUMBER OF B CORPORATION) | B CORPORATION | OFF |
| 3 | TRANSMISSION SOURCE INFORMATION | 03-□□□□-xxxx (FACSIMILE NUMBER OF A CORPORATION [2]) | A CORPORATION | OFF |

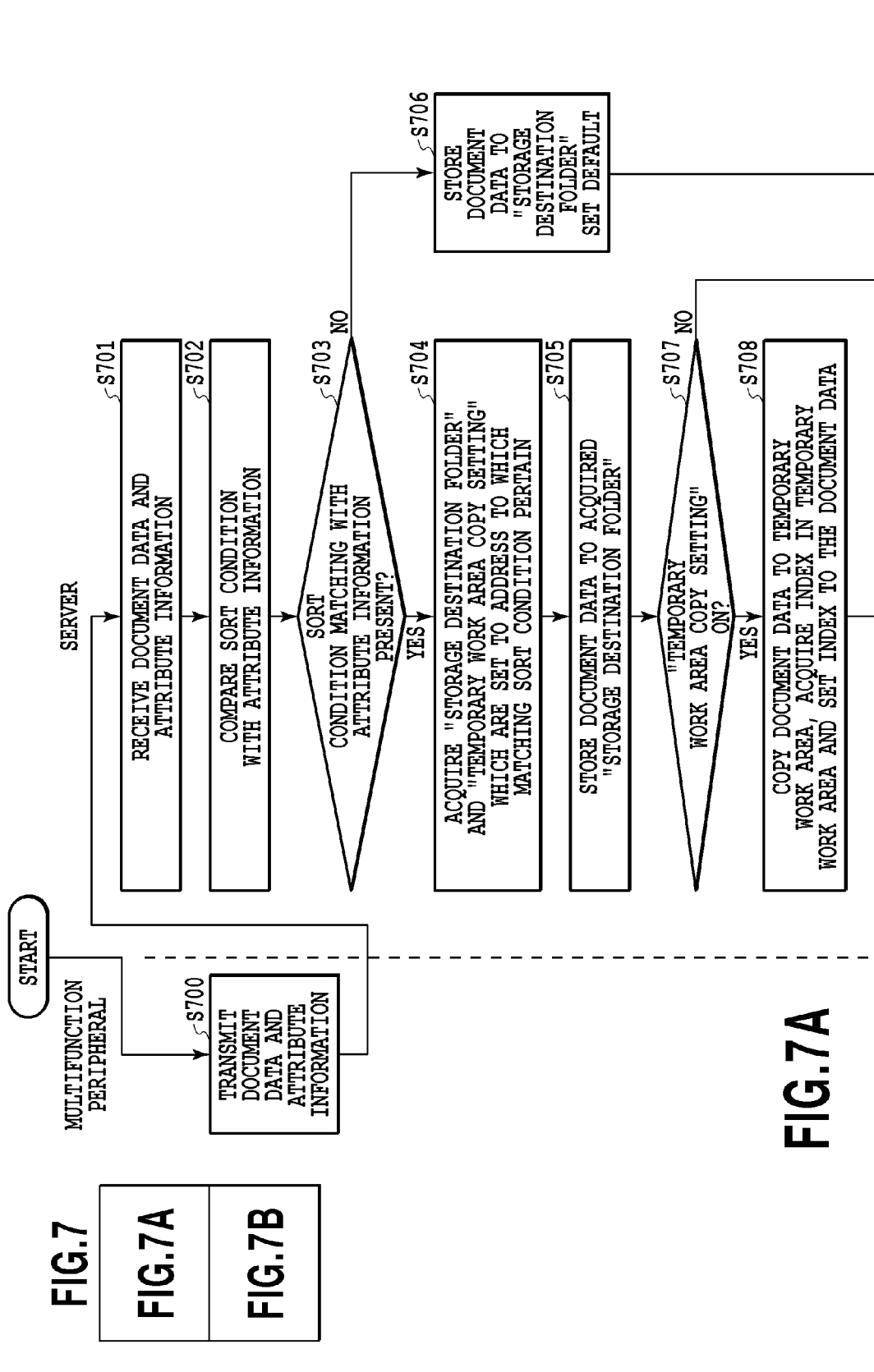

```
<TemporaryAreaSetting>
<Address>ADDRESS1</Address>                              ~901
<Document>
  <TargetDocument ID="2">ESTIMATE SHEET</TargetDocument>  ⎫
  <TargetDocument ID="3">ORDER SHEET</TargetDocument>     ⎬ 902
</Document>                                               ⎭
<Operation>PDF CONVERT INTO PDF</Operation>              ~903
</TemporaryAreaSetting>
```

FIG.9

| ADDRESS | SORT CONDITION | | STORAGE DESTINATION FOLDER | TEMPORARY WORK AREA COPY SETTING | AUTOMATIC EXECUTION SETTING |
|---|---|---|---|---|---|
| 1 | TRANSMISSION SOURCE INFORMATION | 03-0000-xxxx (FACSIMILE NUMBER OF A CORPORATION[1]) | A CORPORATION | OFF | ON |
| 2 | TRANSMISSION SOURCE INFORMATION | 044-△△△-xxxx (FACSIMILE NUMBER OF B CORPORATION) | B CORPORATION | OFF | OFF |
| 3 | TRANSMISSION SOURCE INFORMATION | 03-□□□□-xxxx (FACSIMILE NUMBER OF A CORPORATION[2]) | A CORPORATION | OFF | OFF |

FIG.11

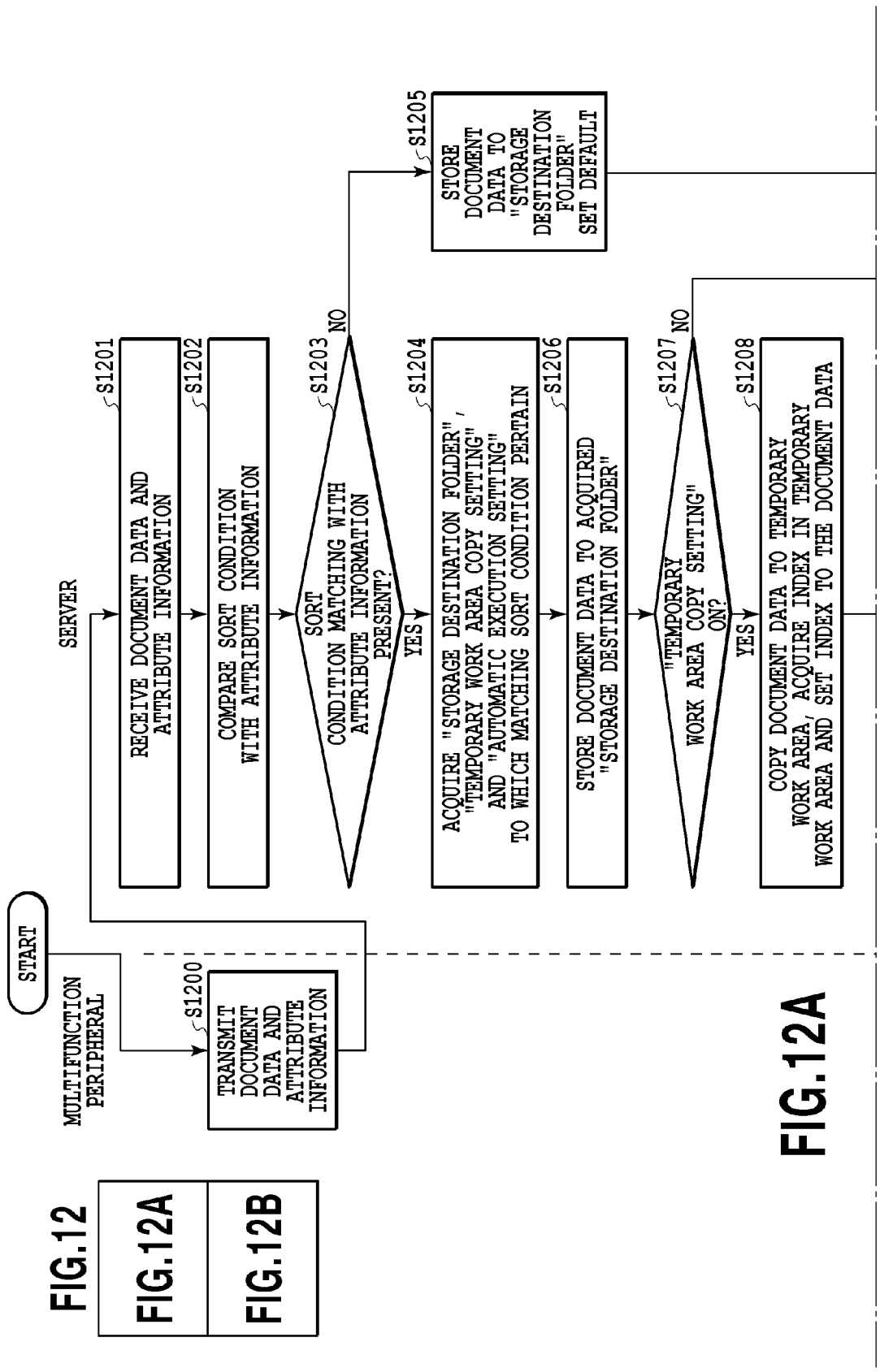

DOCUMENT DATA MANAGEMENT SYSTEM, MANAGEMENT METHOD AND PROGRAM

BACKGROUND OF THE INVENTION

1. Field of the Invention

The present invention relates to a document data management system.

2. Description of the Related Art

In an environment in which a document management system is used, a data of a document which is received via facsimile, a document which is scanned and transmitted by a multifunction peripheral or the like can be managed by storing the data to a folder of the document management system. A user carries out various kinds of operations with regard to the stored document data by making an access to a document management server from a client PC to display the prescribed folder. In this case, if a user carries out an operation which is the same as that he/she carried out in the past with regard to, for example, a stored facsimile document data, the user needs to select the operation again and execute the operation. That is, a user needs to repeat the same operation.

Hence, there has been proposed a document management system which can record information of an operation with regard to a document data as related information of a document, and select and acquire the information when other document data is operated and execute the operation.

There is a case in which a user combines a document data which is stored in a device of a multifunction peripheral or the like, and other document data which is stored in a document management system to be a single document, and carries out a collective operation with regard thereto. As a collective operation, for example, plural document data (file) are combined and converted into PDF, plural document data are made to be a binder, plural document data are summarized and transmitted by facsimile or an electronic mail and so on. However, in a case in which document data which are stored in different folders are summarized and subjected to a collective operation, it is necessary to copy the respective document data temporarily in a work folder (temporary work area), which takes time and labor. Also, in a case of carrying out the collective operation as described above with regard to a document data stored by using a sort server, it is conceivable that a combination of document data which are subjected to the collective operation differs for respective individual document data. In this case, it is necessary to carry out the operation by collecting document data of an object of the collective operation in accordance with respective document data.

For example, according to a technology which is described in Japanese Patent Laid-Open No. 2009-230221, although related information can be applied to a single document data, it is necessary to acquire and select the related information and execute the application at respective times thereof, and therefore, time and labor are taken.

SUMMARY OF THE INVENTION

A document management system according to the present invention is a document management system having a server of storing and managing a document data, and a device of making the server store the document data, wherein the device includes a displaying unit configured to display a user interface for making a user operate and designate the document data, wherein the user interface includes a temporary work area for making the user carry out a collective operation with regard to a plurality of the document data, and wherein the server includes: a receiving unit configured to receive the document data from the device; a document data storing unit configured to store the received document data based on a previously determined sort setting; a document data information storing unit configured to store a piece of information of other document data which is made to be an object of the collective operation in a case in which the collective operation is carried out in the temporary work area with regard to the stored document data; a copying unit configured to copy the document data stored in the document data storing unit to the temporary work area; and a copying unit configured to copy the other document data to the temporary work area based on the piece of information stored in the document data information storing unit.

With regard to a document data stored to a server from a device of a multifunction peripheral or the like, a collective operation along with other document data can easily be executed in a temporary work area.

Further features of the present invention will become apparent from the following description of exemplary embodiments (with reference to the attached drawings).

BRIEF DESCRIPTION OF THE DRAWINGS

FIG. 6A shows a table which indicates an example of an initial state of the sort setting;

FIG. 6B shows a table indicating an example of a state of the sort setting after having been changed;

FIG. 7 is a flowchart showing a flow of a series of processing in a case in which a document data which is transferred from a multifunction peripheral is stored to a document management server, and a collective operation is carried out in a document management system according to Example 1;

FIG. 9 shows an example of a temporary work area setting which is held in a style of XML;

FIG. 11 shows a table indicating an example of sort setting (initial state) according to Example 2;

FIG. 12 is a flowchart showing a flow of processing of a case in which a document data which is transferred from a multifunction peripheral is stored to a document management server, and a prescribed collective operation is automatically executed in a document management system according to Example 2.

DESCRIPTION OF THE EMBODIMENTS

An explanation will be given of a mode for carrying out the present invention in reference to the drawings as follows.

Example 1

System Configuration

Figure 1:
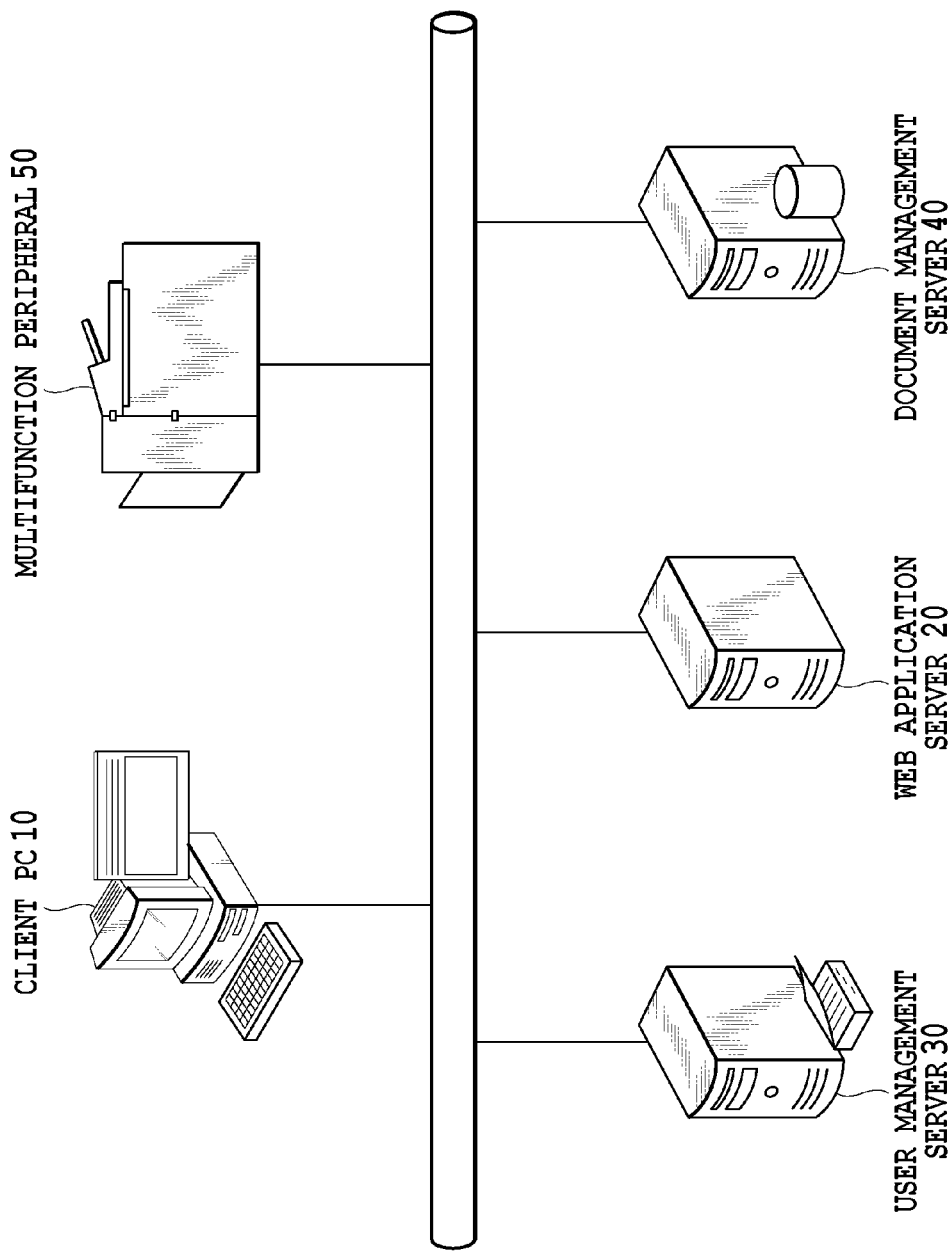
FIG. 1 is a system configuration view of a document management system according to the present embodiment.

FIG. 1 is a system configuration view of a document management system according to an embodiment of the present invention. According to the document management system, a client PC 10, a Web application server 20, a user management server 30, a document management server 40, and a multifunction peripheral 50 are connected to each other via a network. Incidentally, the network includes a regional area network of LAN or the like and an external network of the internet or the like.

A user can make an access to the respective servers from the client PC 10 via a browser, and a user can make an access to the respective servers via UI (user interface) of the multifunction peripheral 50 which is provided with a browser display function. The multifunction peripheral 50 is provided with respective functions of copying, facsimile, internet facsimile and a scanner in addition to a peripheral function. Incidentally, notation internet facsimile designates a bidirectional communication between an electronic mail and a facsimile.

The Web application server 20 is a server which provides a Web application. The user management server 30 is a server which manages information of a user. The document management server 40 is a server which stores/manages a document data, and is provided with a function in which when a document data transmitted from the client PC 10 and the multifunction peripheral 50 is stored, a destination of storage thereof is sorted.

Here, in FIG. 1, the Web application server 20, the user management server 30, and the document control server 40 are shown as the respectively separate servers. However, it is not necessary that the respective servers are independent servers, but the respective servers may be configured by a single server which is integrated with functions of the respective servers. Also, the sort function which the document management server 40 provides may be configured as a function of a different server.

Further, although the system is configured that a user makes an access to the respective servers via the client PC 10 or the multifunction peripheral 50 which is provided separately from the servers, any one or all of the servers may also be provided with a function of the client PC.

Further, although there is constituted a configuration in which scanning is carried out by the multifunction peripheral 50, there may also be constituted a configuration in which a scanner is connected to the client PC 10.

In the document management system according to the present embodiment, a user makes an access to the Web application server 20 via the browser in the client PC 10, and via the user interface (UI) which is provided with a browser display function in the multifunction peripheral 50.

Furthermore, for example, there may be constituted a configuration in which an exclusive client application is arranged at the client PC 10 and the multifunction peripheral 50, and a user makes an access to the respective servers by way thereof. In this case, there may be constituted a configuration in which the Web application server 20 is omitted, and the document management server 40 and the exclusive client application communicate with each other.

Incidentally, a user who makes an access to the Web application server 20 from the multifunction peripheral 50, and a user who makes an access to the Web application server 20 from the client PC 10 may be the same user or different users. That is, a user who stores a scanned document and a user who makes an access to the stored scanned document may not coincide with each other.

[Hardware Configuration]

Figure 2:
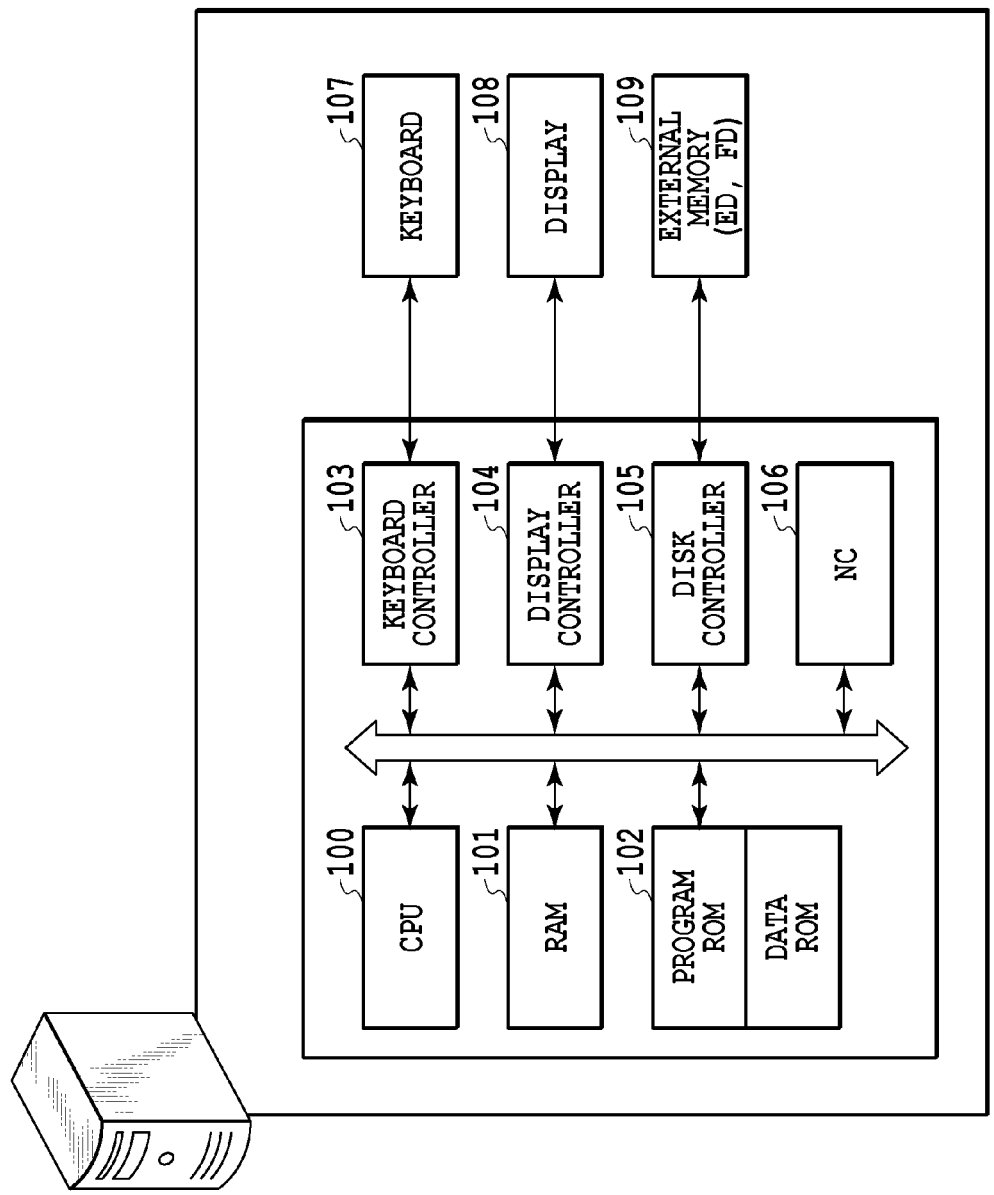
FIG. 2 is a hardware configuration diagram of a client PC and respective servers which configure the document management system according to the present embodiment.
Figure 3:
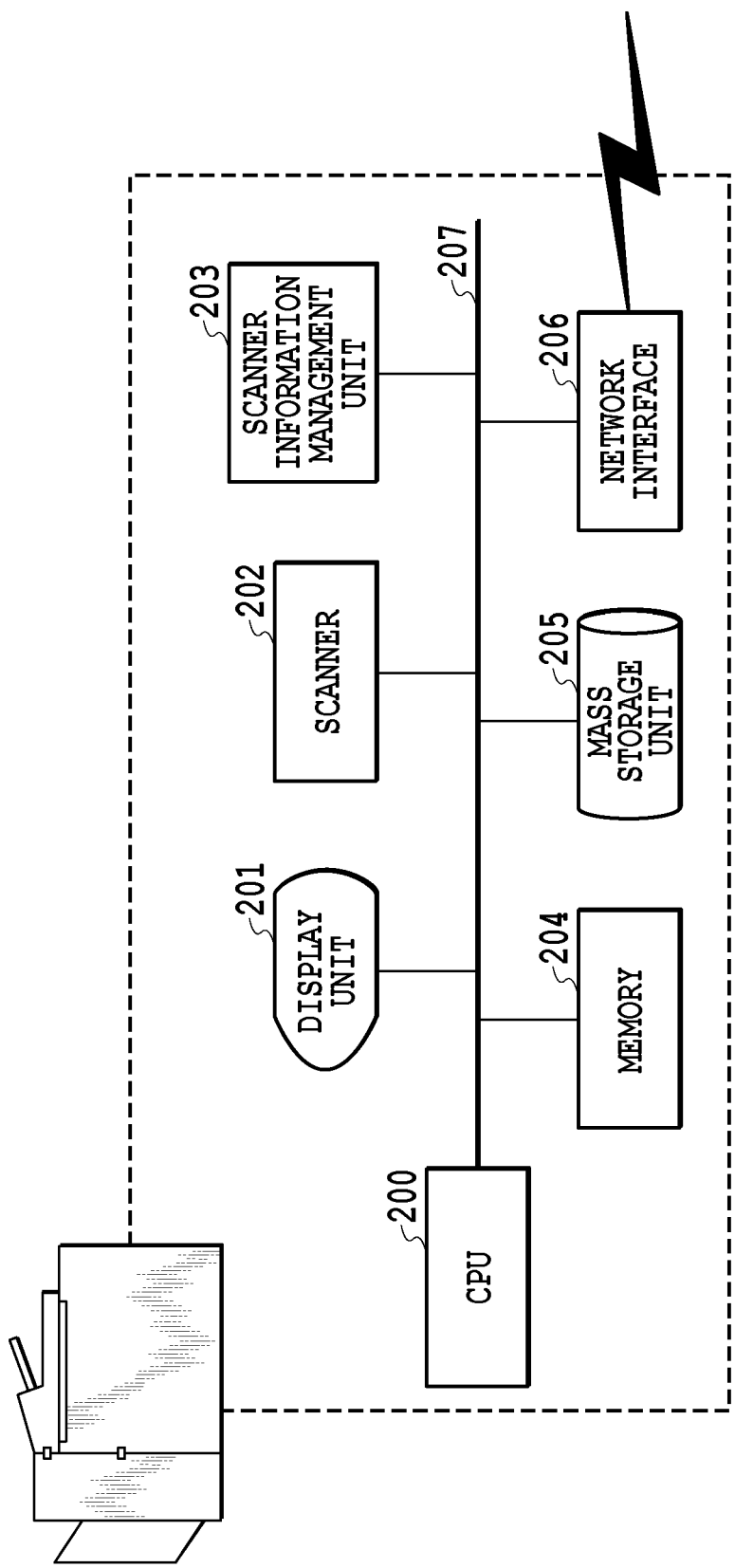
FIG. 3 is a hardware configuration diagram of a multifunction peripheral which configures the document management system according to the present embodiment.

FIG. 2 is a hardware configuration diagram of the client PC 10 and the respective servers 20 through 40 which configure the document management system according to the present embodiment, and FIG. 3 is a hardware configuration diagram of the multifunction peripheral 50 which configures the document managing system according to the present embodiment. The hardware configuration diagrams shown in FIG. 2 and FIG. 3 are hardware configuration diagrams of a general information processing device and a general multifunction peripheral, and a hardware configuration of a general information processing device can be applied to the client PC 10, the servers 20 through 40 and the multifunction peripheral 50 according to the present embodiment.

In FIG. 2, CPU 100 executes a program of OS, an application or the like which is stored to ROM for program of ROM 102, or which is loaded to RAM 101 from a hard disk 109. Incidentally, OS is an abbreviated word of an operating system which is operated on a computer. Processing of respective flowcharts described later can be realized by executing programs. RAM 101 is made to function as a main memory, a work area or the like of CPU 100. A keyboard controller 103 controls a key input from a keyboard 107 or a pointing system, not illustrated. A display controller 104 controls displays of various kinds of display 108. A disk controller 105 controls an access to data in a hard disk (HD) 109 or a floppy (registered trademark) disk (FD) or the like which stores various kinds of data. NC 106 executes a communication control processing with other device which is connected to a network by being connected to the network.

In FIG. 3, CPU 200 controls the multifunction peripheral 50 by being connected to respective units described later via an internal bus 207. A display unit 201 is displayed with a UI screen of a touch panel or the like. A user carries out a desired operation/designation via the UI screen displayed on the display unit 201. A scanner 202 carries out scanning of a document, and a scanner information management unit 203 controls/stores information of function/state of the scanner 202.

A memory 204 is stored with various kinds of instructions (including application program) which CPU 200 executes for controlling the multifunction peripheral 50, and a mass storage unit 205 temporarily stores a data which is scanned by the scanner 202. Also, a network interface 206 transmits and receives a signal via LAN in accordance with CPU 200.

[Software Configuration]

Figure 4:
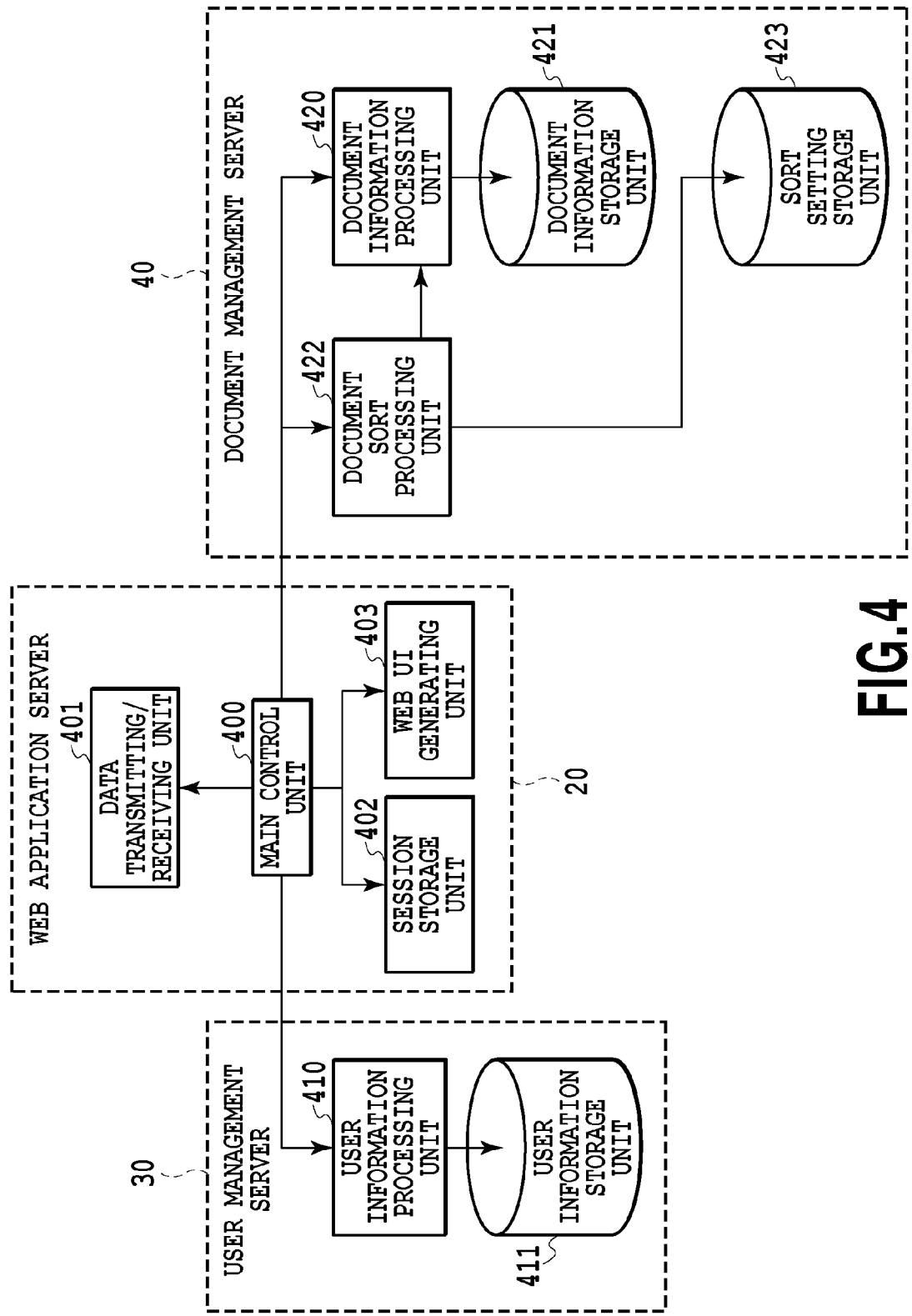
FIG. 4 is a software configuration diagram of the document management system according to the present embodiment.

FIG. 4 is a software configuration diagram of the document management system according to the present embodiment. There is shown a software configuration in the Web application server 20, the user management server 30, and the document management server 40.

A main control unit 400 controls a total of the document management system according to the present embodiment, and carries out designations and managements to the respective units.

A data transmitting/receiving unit 401 receives instructions or various kinds of data including image data or the like from the client PC 10 and the multifunction peripheral 50 via a browser. Also, the data transmitting/receiving unit 401 transmits instructions or various kinds of data to the client PC 10 and the multifunction peripheral 50 in accordance with instructions of the main control unit 400.

At and after a user makes access via the browser from the client PC 10 and the multifunction peripheral 50, a session storage unit 402 generates session information for indicating that the access is the access by the same user. Also, during a time period until a user stops making the access to the document management system (logout), or a session expirers by an automatic time-out or the like, the session storage unit 402 stores various kinds of information which are repeatedly used by relating the various kinds of information to the session information.

A Web UI generating unit 403 receives a designation of the main control unit 400, and generates a Web UI (a data of a UI screen described by, for example, HTML) in accordance with a situation. Here, the Web UI which is generated by the Web UI generating unit 403 is not limited to the HTML data but may be embedded with a script language of JavaScript or the like.

A user information processing unit 410 carries out an operation of extracting, setting or the like of a user and user setting information (UI setting information or the like) which is accessible to the document management system that is stored in a user information storage unit 411 in accordance with a designation from the main control unit 400. Incidentally, with regard to the user management, not the individual management of the present document management system but a technology which is already known may be used. That is, the user information processing unit 410 may cooperate with Active Directory or LDAP (Lightweight Directory Access Protocol) or the like, and only the user setting information may be stored in the user information storage unit 411.

A document information processing unit 420 carries out registration, editing or the like of information of an entity of a document or an attribute thereof or the like of a document which is stored at a document information storage unit 421 in accordance with a designation from the main control unit 400. Also, a document data which is copied to the temporary work area, and information with regard to temporary work area setting are stored in the document information storage unit 421. Details of the temporary work area setting will be described later. Incidentally, as described in Description of the Related Art, according to the present specification, with regard to plural document data which are stored in respectively separate holders, an area for a work for carrying out a collective operation by summarizing the document data is referred to as "temporary work area".

At a document sort processing unit 422, there is executed a sort processing for setting a storage destination or a property with regard to a document data which is transmitted from the multifunction peripheral 50 or the like on the basis of a sort condition that is stored in a sort setting storage unit 423.

Incidentally, as described above, the functions of the respective units described above may be realized by a single server. For example, a software may be configured such that all of the functions of respective units described above are realized within the Web application server 20.

Next, an explanation will be given of sort setting which is referred to when a document data is sorted and stored in the document management server 40.

Figure 5:
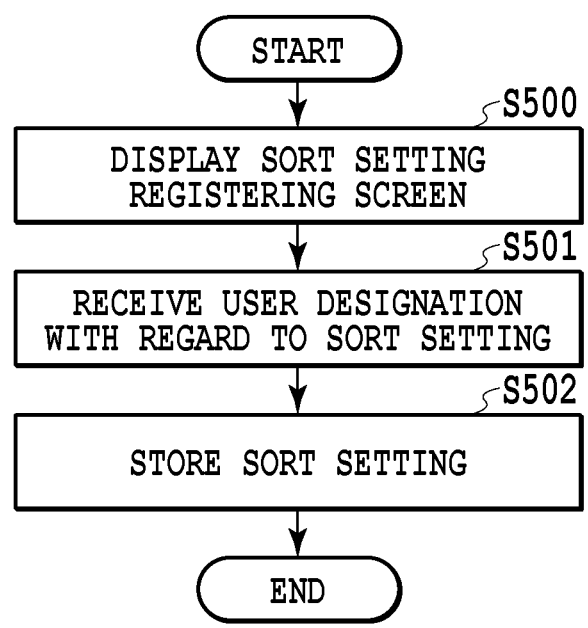
FIG. 5 is a flowchart showing a flow of processing of registering sort setting.

FIG. 5 is a flowchart showing a flow of processing of registering sort setting in the document management system according to the present embodiment. Although according to the present embodiment, it is assumed that registration of sort setting is carried out in the client PC 10, naturally, the registration may be carried out at other server.

At step 500, the Web UI generating unit 403 of the Web application server 20 generates a sort setting registration screen (not illustrated), and transmits the screen information to the client PC 10 via the data transmitting/receiving unit 401. Also, at this occasion, it is confirmed whether sort setting which has already been stored is present at the user information storage unit 411 via the main control unit 400. In a case in which the sort setting has already been held, a content of the setting is acquired, and is displayed on the display 108 of the client PC 10. Here, the sort setting includes information of "a sort condition" which becomes a reference when a document data is sorted, "storage destination folder" which indicates to which folder a document is sorted, "temporary work area copy setting" indicating whether a document is copied (stored) to a temporary work area and so on. Incidentally, although information (flag) of whether "ON" or "OFF" is set to the temporary work area copy setting, in a state of default, the flag is set to "OFF", and the flag is set to "ON" by a processing at step 712 in a flowchart of FIG. 7 described later.

At step 501, the client PC 10 receives a designation with regard to sort setting from a user via the keyboard 107. Respective items are set for respective address numbers in accordance with a designated content thereof. FIG. 6A shows a table indicating an example of an initial state of sort setting in a case in which the document data which is sorted to be stored is a document that is received by facsimile. It is known that in FIG. 6A, for example, with regard to an address number 1, as a sort condition of a document received by facsimile, "transmission source: facsimile number (1) of A Corporation", "A Corporation" as a storage destination folder, and "OFF" as a temporary work area copy setting are set. Naturally, a content of a sort condition depends on an attribute of a document data which is registered. For example, a condition of enabling sort is set by a route thereof such that in a case of a scanned data, by which scanner the data is scanned, in a case of internet facsimile from which mail address the document is received and so on.

Further, when a document data is stored, the content which is registered to the sort condition and attribute information accompanied by an entity of the document which is transmitted from the multifunction peripheral 50 or the like are compared with each other. In a case where the both match with each other, the document data is stored to a storage destination folder in correspondence with the condition.

At step 502, the client PC 10 transmits the information of the sort setting to the Web application server 20. The Web application server 20 stores the received information of the sort setting to the user information storage unit 411 via the main control unit 400.

Incidentally, the sort setting which is stored and registered to the user information storage unit 411 may be applied only to a user who carries out the registration, or may be applied to a specific user or all of users commonly.

[Storing Document to Document Management Server]

Figure 7B:
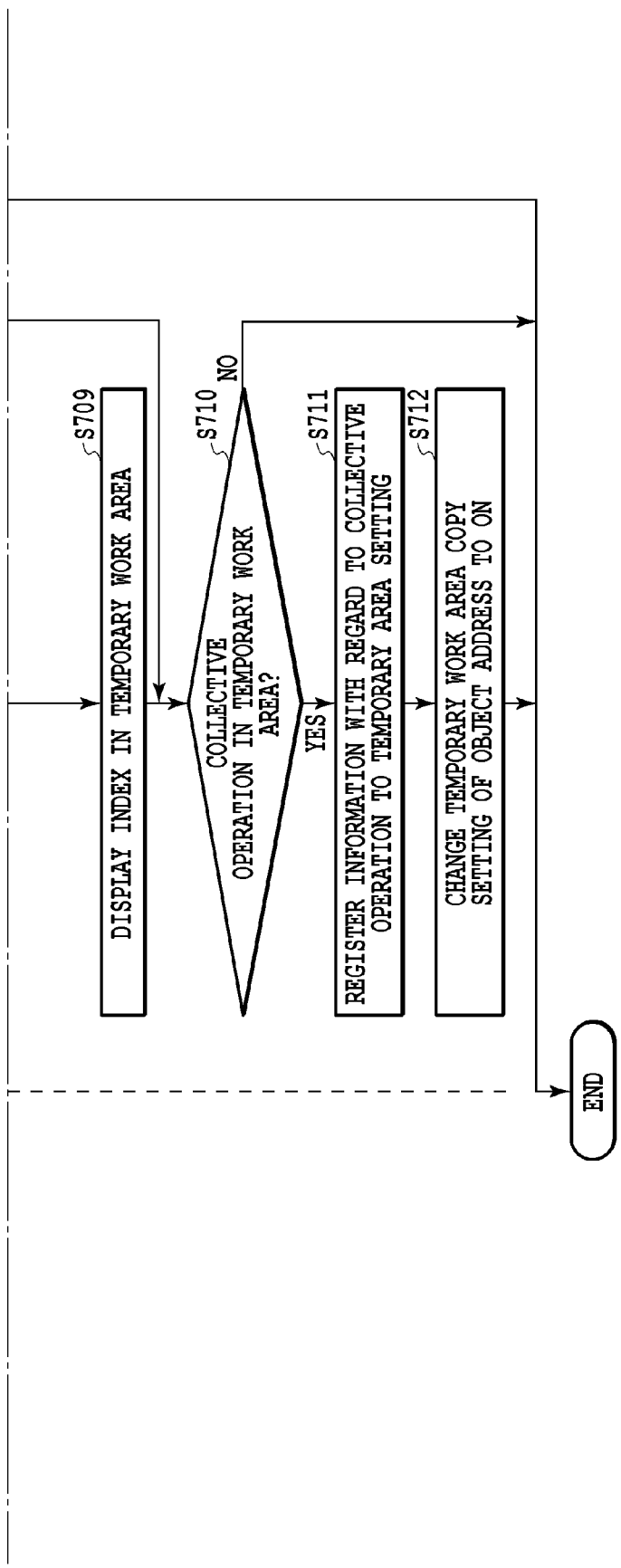
FIG. 7 is a flowchart showing the relationship between FIGS. 7A and 7B.

FIG. 7 is a flowchart showing a flow of a series of processing in a case in which in the document management system according to the present embodiment, a document data which is transmitted from the multifunction peripheral 50 is stored to the document control server 40, and successively, a prescribed collective operation is carried out. In the present embodiment, storing of a document data from the multifunction peripheral 50 or the like to the document management server 40 is realized by transferring a data of a document which is received by facsimile or the like in the multifunction peripheral 50 to the Web application server 20.

First, an explanation will be given by assuming that as a user operation at an initial time, in the multifunction peripheral 50, a data of a facsimile document which is received from A Corporation is stored to the document management server 40, and successively, there is carried out a collective operation of converting data of estimate sheet as well as an order sheet summarizingly into PDF.

At step 700, the multifunction peripheral 50 transmits (transfers) a data of a facsimile document (an image data which is an entity of the corresponding facsimile document) which is received from outside to the Web application server 20 along with attribute information of the facsimile document. Here, the attribute information is information in correspondence with "sort condition" within sort setting described above. Here, as the sort condition, there is assumed a facsimile number classified by a corporation as shown in a table of FIG. 6A. Therefore, a content of the attribute information in this case becomes information of a facsimile number of a transmission source of the facsimile document.

At step 701, the Web application server 20 receives the data of the facsimile document and attribute information via the data transmitting/receiving unit 401.

At step 702, the document sort processing unit 422 of the document management server 40 reads the sort condition within the sort setting which is related to the corresponding user from the sort setting storage unit 423 and compares the sort condition with the received attribute information. Incidentally, information of the sort setting is stored to the sort setting storage unit 423 at a time point at which a user makes an access from the multifunction peripheral 50 to the Web application server 20. That is, the information of the sort setting described above which is related to the user that has been registered beforehand is read from the user information storage unit 411, and is stored to the sort setting storage unit 423 via the main control unit 400 prior to the comparison processing.

At step 703, the document sort processing unit 422 determines whether there is a sort condition which matches with the received attribute information as a result of the comparison. In a case in which the matching sort condition is determined to be present, the operation proceeds to step 704. On the other hand, in a case in which the matching sort condition is determined not to be present, the operation proceeds to step 706.

At step 704, the document sort processing unit 422 acquires contents of "storage destination folder" and "temporary work area copy setting" which are set to an address to which the matching sort condition pertains and delivers the contents to the document information processing unit 420.

At step 705, the document information processing unit 420 stores a data of the facsimile document which is received from the multifunction peripheral 50 to a folder which is designated by "storage destination folder" that is acquired at step 704. At this occasion, as information which is accompanied by the stored document data, there is set an address to which the matching sort condition pertains. For example, in a case in which the data of the facsimile document is stored to a folder of a folder name "A Corporation" by matching with a sort condition of address number 1 in the sort setting shown in FIG. 6A, "address 1" is set to the stored document data as accompanied information.

At step 706, the document information processing unit 420 stores and registers the data of the facsimile document to a storage destination folder of default that is previously set. As the storage destination folder of the default, there may be set individual storage destination folders for respective users, or there may be set a storage destination folder that is commonly used in a total of the system.

At step 707, the document information processing unit 420 determines whether the content of the temporary work area copy setting that is acquired at step 704 is "ON". In a case in which the content is set to "ON", the operation proceeds to step 708. On the other hand, in a case in which the content is set to "OFF", the operation proceeds to step 710. Here, in a case in which an operation which is carried out by a user is a storage operation at an initial time, the operation is yet to be processed by step 712 described later, and therefore, the temporary work area copy setting is necessarily brought into a state of OFF. Therefore, in the case of the storage processing at the initial time, the operation necessarily proceeds to step 710, and processing of step 708 and step 709 are skipped. Therefore, an explanation will be given precedingly of processing at and after step 710.

At step 710, the document information processing unit 420 determines whether a user per se operates the document data which is stored at preceding step 705 to copy the document data to the temporary work area, thereafter, some collective operation is carried out. Specifically, information of operation and designation by a user which is received by the data transmitting/receiving unit 401 is delivered to the document information processing unit 420 via the main control unit 400. Therefore, it is determined whether some collective operation is carried out in the temporary work area by using the information. In a case in which the document data is copied to the temporary work area and the collective operation is carried out, the operation proceeds to step 711. On the other hand, in a case in which the user does not carry out such an operation, the operation passes the present processing.

At step 711, the document information processing unit 420 stores the information with regard to the collective operation as the temporary work area setting. That is, according to the present embodiment, information of what collective operation is carried out along with what other document data and the document data stored at step 705 which is collectively operated, is stored in accordance with a storage destination folder pertaining to which address No. Here, the temporary work area setting is a setting for storing various kinds of information related to the temporary work area, and information of these stored as the temporary work area setting is used to display the temporary work area on a UI screen in the form of an index in the temporary work area at step 709 described later.

Figure 8:
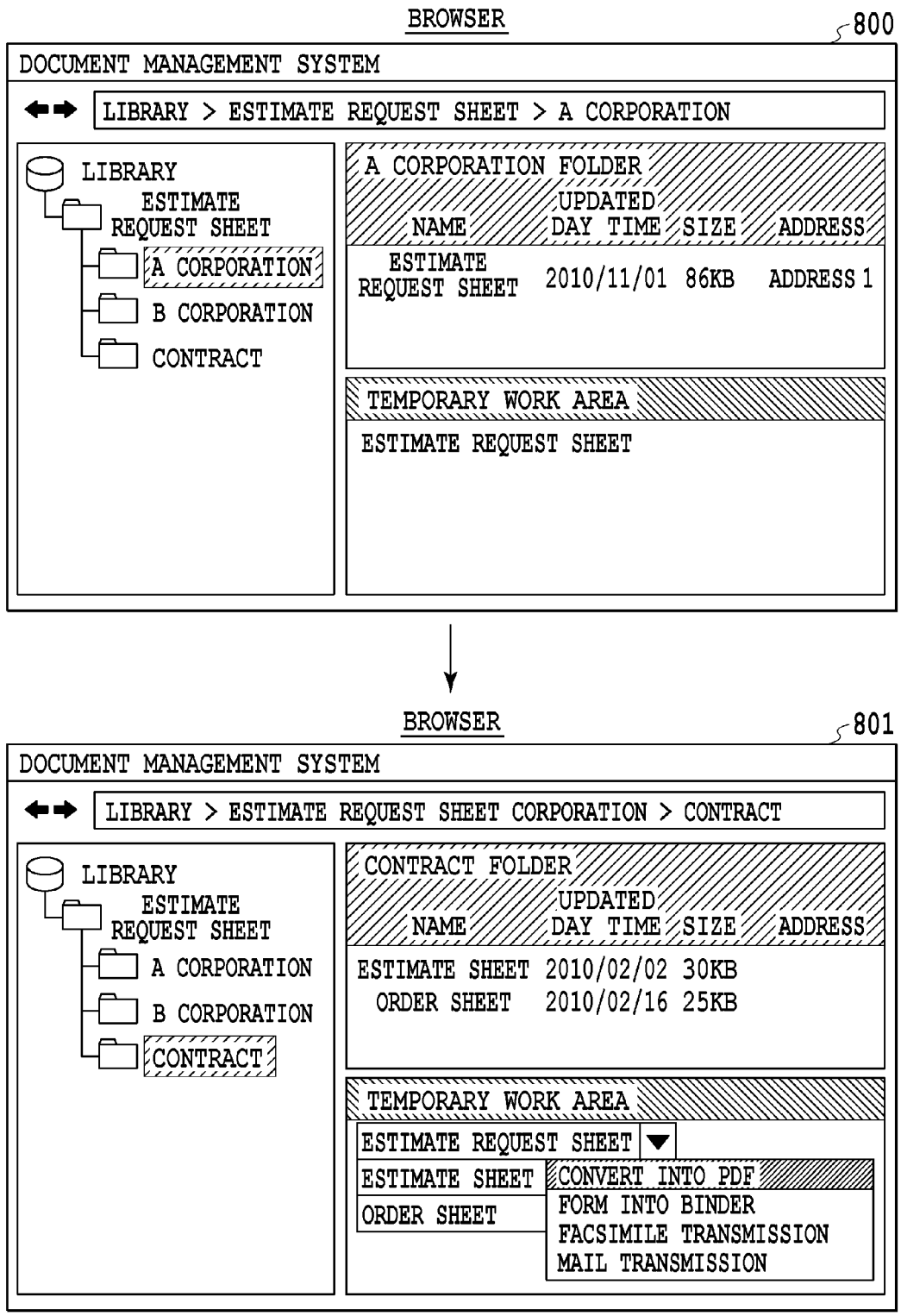
FIG. 8 is a view showing examples of UI screens which are displayed on a multifunction peripheral or a client PC.

FIG. 8 illustrates diagrams showing an example of a UI screen which is displayed on the display unit 201 of the multifunction peripheral 50 in a case in which a certain user stores a data of a facsimile receiving document from the multifunction peripheral 50 initially to the document management server 40, and a collective operation is carried out by combining the data and a document data which is stored to other folder. A screen 800 of FIG. 8 shows a state in which a user copies a data of "estimate request sheet" which is a facsimile receiving document that is sorted to a folder of a folder name "A Corporation" to the temporary work area. Further, a screen 801 of FIG. 8 shows a state in which a document data of "estimate sheet" and "order sheet" which is stored at a folder of a folder name "contract" is additionally copied to the temporary work area by a user, and "convert into PDF" is selected from a collective processing menu which constitutes an object thereby. According to the present step, information of these is stored in a style of a table of, for example, XML or DB. FIG. 9 shows an example of the temporary work area setting which is sorted in the style of XML. It is known that there are stored respective pieces of information stating that the document data is sorted to a prescribed folder in accordance with "address 1" (901), a collective operation is carried out in combination of document data of "estimate sheet" and "order sheet" (902) and a content of the collective operation is "convert into PDF".

At step 712, the document sort processing unit 422 changes a content of the temporary work area copy setting of an object address which is used when the document data is stored at step 705 with regard to the document data which is subjected to the corresponding collective operation. That is, the temporary work area copy setting of an address number to which a storage destination folder that is referred to at step 705 pertains is changed from "OFF" to "ON". FIG. 6B shows a state of the sort setting after having been changed, and the temporary work area setting of the address number 1 is changed to "ON".

Successively, an explanation will be given of a flow in a case in which the collective operation is carried out when the document at an initial time is stored, and other document data is stored at and after changing the temporary work area copy setting to "ON" at step 712.

Processing at step 700 to step 705 are similar to those when the document data is stored at an initial time. However, the content of the temporary work area copy setting which is acquired at step 704 is changed to "ON" at this time.

At step 707, the document information processing unit 420 proceeds to step 708 since the content of the temporary work area copy setting which is acquired at step 704 is "ON".

At step 708, the document information processing unit 420 carries out copying a document data to the temporary work area automatically (without depending on the user operation) since the content of the temporary work area copy setting is "ON". Further, the address which is used in storing the copied document data is acquired in reference to the accompanying information, the content of the temporary work area setting in correspondence with the address is acquired and set to the copied document data as an index in the temporary work area.

At step 709, the Web UI generating unit 403 of the Web application server 20 generates information of the UI screen which includes the set index in the temporary work area and transmits the information to the multifunction peripheral 50. The multifunction peripheral 50 displays the content of the index in the temporary work area by using the received UI screen information.

Figure 10:
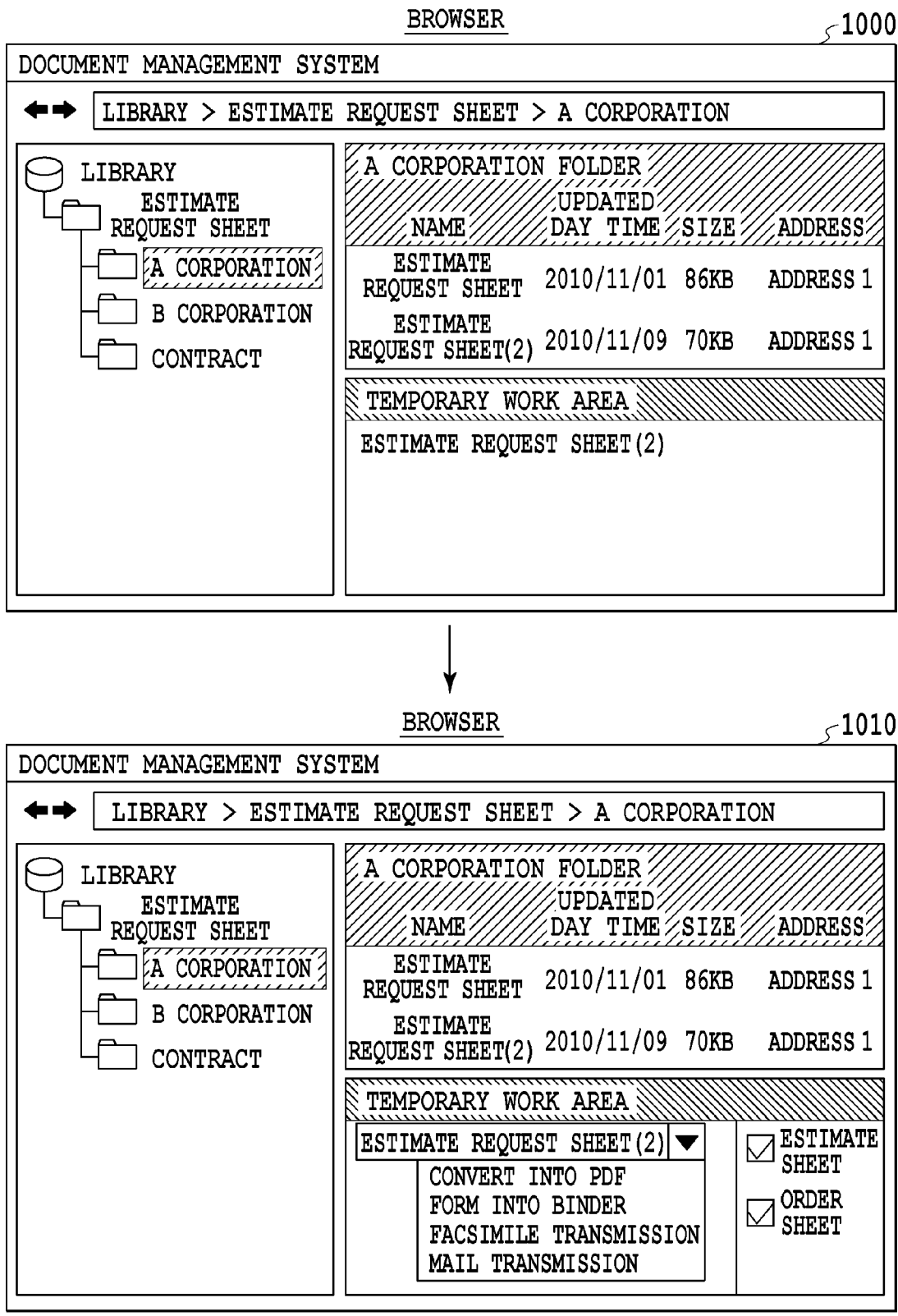
FIG. 10 is a view showing examples of UI screens which are displayed on a multifunction peripheral or a client PC.

FIG. 10 is a diagram showing an example of a UI screen (in correspondence with FIG. 8) in a case in which a user who stores an estimate request sheet (1) from A Corporation to the document management server 40, stores an estimate request sheet (2) from A Corporation similarly successively, and carries out a collective operation together with a document which is stored to other folder. In a screen 1000 of FIG. 10, "estimate request sheet (2)" which is stored to a folder of a folder name "A Corporation" is copied to the temporary work area (step 708). As described above, "estimate request sheet (2)" is set with "address 1" which is an address number to which a matching sort condition pertains as accompanying information (step 705). Based on the accompanying information, information which is stored from the temporary work area setting by being related to "address 1", that is, information which is shown in 902 and 903 of FIG. 9 is acquired (step 708). Further, there is generated a UI screen in a state in which two of document data of "estimate sheet" and "order sheet" are displayed in the temporary work area as an index in the temporary work area by using information of 902 in the acquired information, and the UI screen is displayed on the display unit 201 (step 709).

Thereby, a user can carry out an arbitrary collective operation with regard to "estimate request sheet (2)", "estimate sheet" and "order sheet" which are displayed (copied) automatically in the temporary work area after processing to store "estimate request sheet (2)" from a processing menu which is subjected to pull-down display or the like.

Further, other document data can be copied manually from an arbitrary folder to the temporary work area, and the collective processing can also be carried out in combination with the document data.

Further, the document data which is copied (displayed) to the temporary work area may be common among users.

Further, in a case in which an access right is set to each folder, and, for example, a document stored to "A Corporation" folder is copied to the temporary work area, there may be needed a password authorization or the like for making an access to the A corporation folder.

In this way, according to the present invention related to the present embodiment, when a document is stored to the document management server, the document is copied to the temporary work area automatically in accordance with the collective operation which is carried out by a user therebefore and is displayed on the UI screen. Further, also other document data which is used in carrying out a collective operation at a preceding time is displayed automatically as an index in the temporary work area. Therefore, a user can carry out various kinds of collective operations easily by summarizing a document data immediately after having been stored and other document data which is stored therebefore.

Example 2

According to Example 1, a user can display a document data which is stored from a device to a server automatically to a temporary work area of a UI screen, also other document data which is anticipated to be related thereto can be displayed automatically, thereby, a user can easily realize the collective operation. Next, an explanation will be given of a mode of automatically executing a prescribed collective operation as Example 2. Incidentally, an explanation will be simplified or omitted with regard to a portion which is common to Example 1 which has been described already, and an explanation will be given here centering on points of differences.

FIG. 11 shows a table showing an example of sort setting (initial state) according to the present embodiment. A difference of the table from the table which is shown in FIG. 6A showing an example of sort setting according to Example 1 resides in that an item of "automatic execution setting" is added. According to the "automatic execution setting", similar to the temporary work area copy setting, information (flag) of either of "ON" or "OFF" is inputted. However, different from the temporary work area copy setting, a user arbitrarily selects and sets "ON" or "OFF". In an example of FIG. 11, automatic execution setting which pertains to address number 1 is set to "ON" by a user.

Incidentally, a flow of registration processing of sort setting according to the present embodiment does not differ from the content which is shown in the flowchart of FIG. 5 of Example 1 except that the item of "automatic execution setting" described above is added. Therefore, an explanation thereof will be omitted.

[Storing Document to Document Management Server and Automatic Execution of Operation of Index in Temporary Work Area]

Figure 12B:
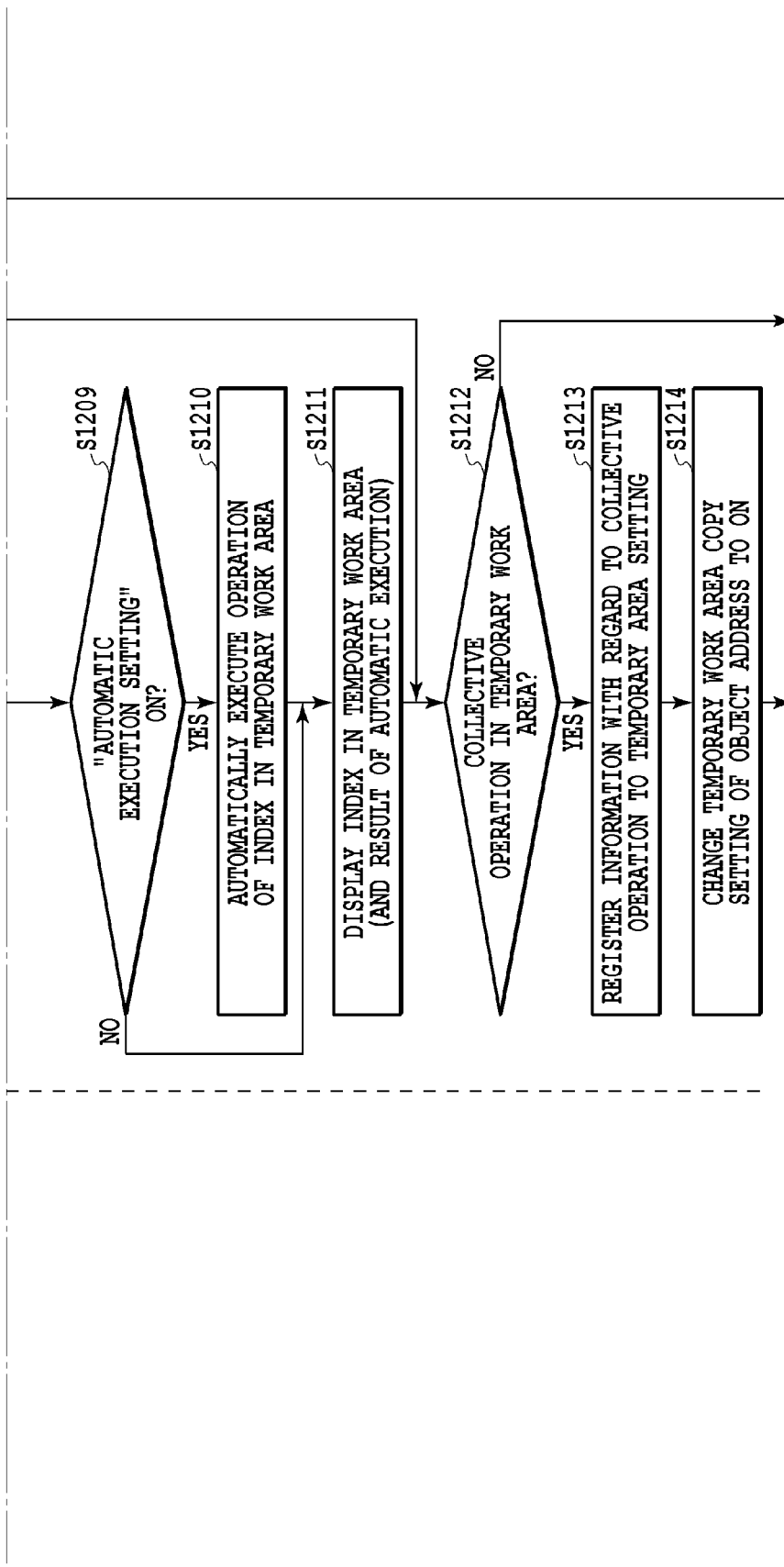
FIG. 12 is a flowchart showing the relationship between FIGS. 12A and 12B.

FIG. 12 is a flowchart showing a flow of processing in a case in which a document data is stored from the multifunction peripheral 50 to the document management server 40 and a prescribed collective operation which is registered to the temporary work area setting is automatically executed in a document management system according to the present embodiment.

Step 1200 through step 1208 respectively correspond to step 700 through 708 of the flowchart of FIG. 7 according to Example 1. However, at step 1204 according to the present embodiment, the step 1204 differs from step 704 in that not only "storage destination folder" and "temporary work area copy setting" but also information of "automatic execution setting" are acquired.

When a document data which is received from the multifunction peripheral 50 is stored based on "sort condition", the document data is copied to the temporary work area in accordance with temporary work area copy setting, and information of temporary work area setting is acquired and set (steps 1206 through 1208), the operation proceeds to step 1209.

At step 1209, the document information processing unit 420 determines whether the automatic execution setting which is acquired at step 1204 is set to "ON". In a case in which the automatic execution setting is set to "ON", the operation proceeds to step 1210. On the other hand, in a case in which the automatic execution setting is set to "OFF", the operation proceeds to step 1211.

At step 1210, the document information processing unit 420 automatically executes a content of a collective operation which is included in the temporary work area setting that is set to the document data copied to the temporary work area at step 1208 (refer to 903 of FIG. 9).

Figure 13:
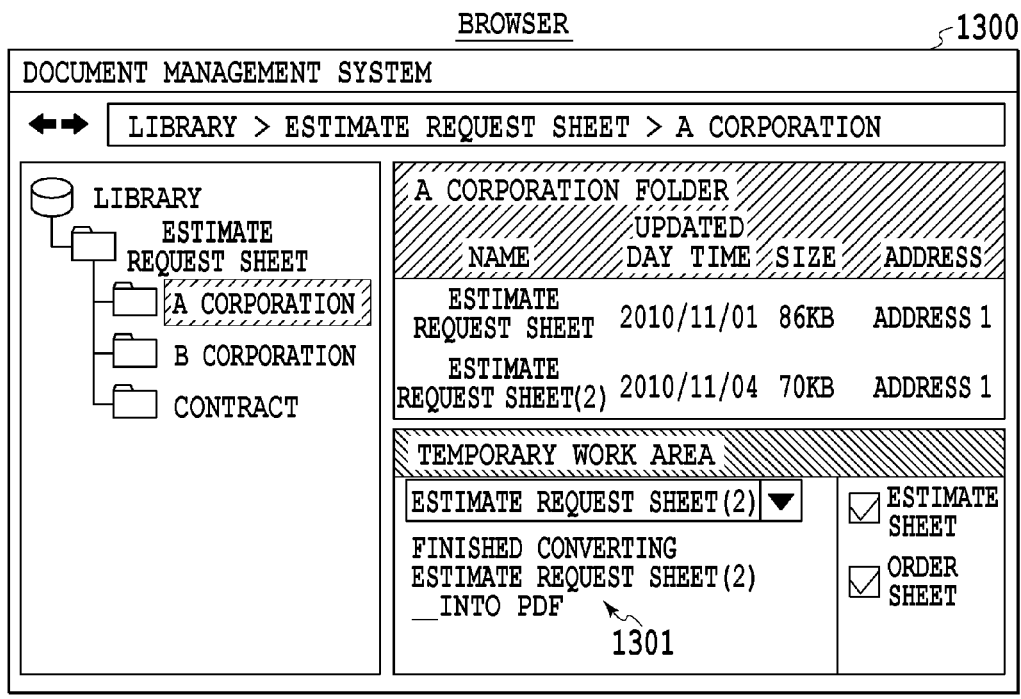
FIG. 13 is a view showing an example of a UI screen which is displayed on a multifunction peripheral or a client PC.

At step 1211, the Web UI generating unit 403 generates UI information for displaying the index in the temporary work area, and transmits the UI information to the multifunction peripheral 50. Further, in a case in which the automatic execution processing is carried out at step 1210, also UI information for displaying a result thereof is generated, and is transmitted to the multifunction peripheral 50 along with UI screen information for displaying the index in the temporary work area. FIG. 13 shows an example of a screen which is displayed on the display 108 of the multifunction peripheral 50 based on UI screen information which is generated and transmitted in this way. According to the screen 1300, when "estimate request sheet (2)" which is stored to a folder of a folder name "A Corporation" is copied to the temporary work area, "converting into PDF" which is a collective operation that is registered to the temporary work area setting is automatically executed. Therefore, characters of "finished converting estimate request sheet (2) into PDF" (1301) which is a result of the automatic execution is displayed on the temporary work area.

Respective processing of step 1212 through step 1214 thereafter respectively correspond to step 710 through step 712 of the flowchart of FIG. 7 according to Example 1, and therefore, an explanation thereof will be omitted.

In this way, according to the present embodiment, the content of the prescribed collective operation which is registered to the temporary work area setting is automatically executed, and therefore, a burden on a user can further be alleviated.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-187312, filed Aug. 30, 2011, which is hereby incorporated by reference herein in its entirety.

What is claimed is:

1. A document management system having a server for storing and managing document data, and a device for making the server store the document data, wherein
    the device comprises a displaying unit configured to display a user interface for making a user operate the document data, wherein
    the user interface includes a temporary work area for making the user carry out a collective operation with regard to a plurality of the document data, and wherein
    the server comprises:
    a receiving unit configured to receive first document data from the device;
    a document data storing unit configured to store the received first document data based on a predetermined setting in accordance with an attribute of the received first document data;
    a document data information storing unit configured to store a piece of information of second document data, where the second document data is made to be an object of the collective operation in a case in which the collective operation is carried out in the temporary work area with regard to the first document data which is stored by the document data storing unit;
    a first copying unit configured to copy third document data to the temporary work area in a case where the third document data, which is different from the first document data but having the same attribute as the first document data, is received by the receiving unit and stored by the document data storing unit; and
    a second copying unit configured to copy second document data to the temporary work area to carry out the collective operation by using the third document data, based on the piece of information of the second document data stored in the document data information storing unit.

2. The document management system according to claim 1, wherein
    the setting includes a piece of information of a temporary work area copy setting indicating whether copying to the temporary work area is carried out or not; and wherein
    the first copying unit copies the third document data to the temporary work area in accordance with the piece of information of the temporary work area copy setting.

3. The document management system according to claim 1, wherein
    the document data information storing unit further stores, in a case in which the collective operation is carried out at the temporary work area with regard to the document data which is stored by the document data storing unit, a content of the collective operation, and wherein
    the server further comprises a unit for automatically executing the collective operation.

4. A document data management method in a server of a document management system having the server store and manage document data, and a device make the server store the document data, the device comprising a displaying unit configured to display a user interface for making a user operate the document data, wherein the user interface includes a temporary work area for making the user carry out a collective operation with regard to a plurality of the document data, the management method performed by the server comprising the steps of:

receiving first document data from the device;

a document data storing step of storing the received first document data based on a predetermined setting in accordance with an attribute of the received first document data;

a document data information storing step of storing a piece of information of second document data, wherein the second document data is made to be an object of the collective operation in a case in which the collective operation is carried out in the temporary work area with regard to first document data which is stored by the document data storing step, a first copying step of copying third document data to the temporary work area in a case where the third document data, which is different from the first document data but having the same attribute as the first document data, is received by the receiving step and stored by the document data storing step; and a second copying step of copying second document data to the temporary work area to carry out the collective operation by using the third document data, based on the piece of information of the second document data stored in the document data information storing step.

5. A non-transitory computer readable storage medium on which is recorded code of a program for causing a computer to perform the management method of the document data management system according to claim 4.

* * * * *